United States Patent [19]

Yuki et al.

[11] Patent Number: 4,499,541
[45] Date of Patent: Feb. 12, 1985

[54] INPUT CIRCUIT OF A FORK LIFT TRUCK CONTROL SYSTEM FOR A FORK LIFT TRUCK

[75] Inventors: Katsumi Yuki, Toyota; Susumu Yoshida, Aichi; Mineo Ozeki, Ichinomiya; Yasuyuki Miyazaki, Aichi; Masaru Kawamata, Numazu, all of Japan

[73] Assignee: Kabushiki Kaisha Toyoda Jidoh Shokki Seisakusho, Japan

[21] Appl. No.: 364,401

[22] Filed: Mar. 31, 1982

[30] Foreign Application Priority Data

Mar. 31, 1981 [JP] Japan ............................. 56-45958[U]

[51] Int. Cl.³ .......................... G06F 15/50; B66F 9/06
[52] U.S. Cl. ................................... 364/424; 414/273; 414/636; 377/17
[58] Field of Search ...................... 364/424, 478, 562; 340/686; 414/272, 273, 274, 275, 632-638; 187/29 R, 29 A, 29 B; 377/17

[56] References Cited

U.S. PATENT DOCUMENTS

| | | | |
|---|---|---|---|
| 3,638,186 | 1/1972 | Schwefel | 377/17 |
| 3,811,648 | 5/1974 | Ream, Jr. et al. | 377/17 |
| 4,094,371 | 6/1978 | Ferrell | 377/17 |
| 4,108,282 | 8/1978 | Satoh et al. | 187/29 R |
| 4,126,237 | 11/1978 | Downing et al. | 414/636 |
| 4,201,911 | 5/1980 | Dering | 377/17 |
| 4,266,215 | 5/1981 | Adams | 377/17 |
| 4,411,582 | 10/1983 | Nakada | 414/636 |

*Primary Examiner*—Gary Chin
*Attorney, Agent, or Firm*—Lowe, King, Price & Becker

[57] ABSTRACT

An improved fork lift truck control system using a microcomputer, which comprises a sensing unit including a first sensor for detecting a lift height of a fork above its lowest position and a second sensor for detecting a tilting angle of an upright with respect to a neutral position of the upright including an input interface circuit for interfacing the sensing unit and control unit which has: (a) a lifting height counting circuit which counts the number of pulses produced on a basis of two photo-converted electrical signals fed from two photocouplers constituting the first sensor, the signals having a phase difference of 90° from each other, so that an accurate measurement of the lifting height of the fork can be made; (b) an analog-to-digital converter which produces a bit string according to an output signal from the second sensor; and (c) an abnormal detection facility which detects a defective analog-to-digital converter and second sensor by comparing the bit string presently outputted from the analog-to-digital converter with each of predetermined bit strings that would be produced if the analog-to-digital converter operates normally.

7 Claims, 13 Drawing Figures

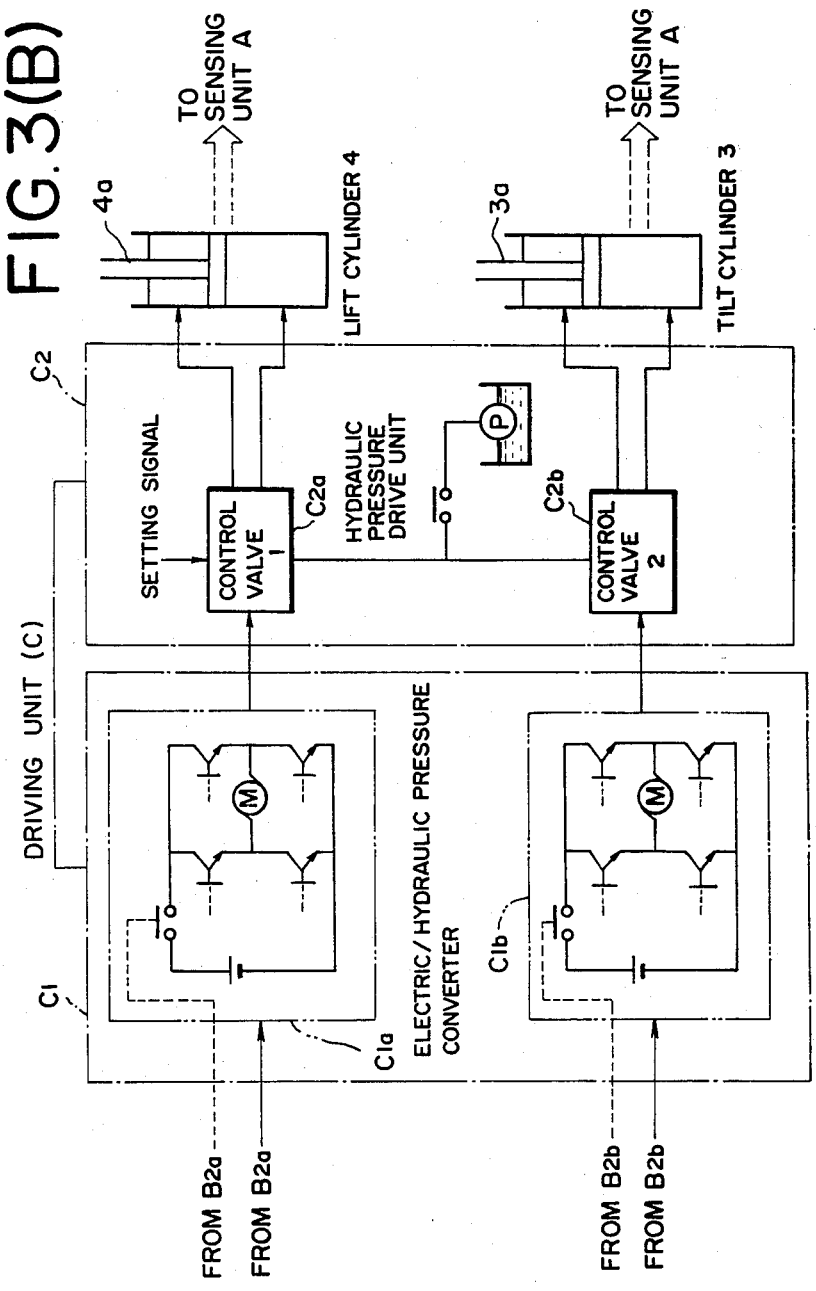

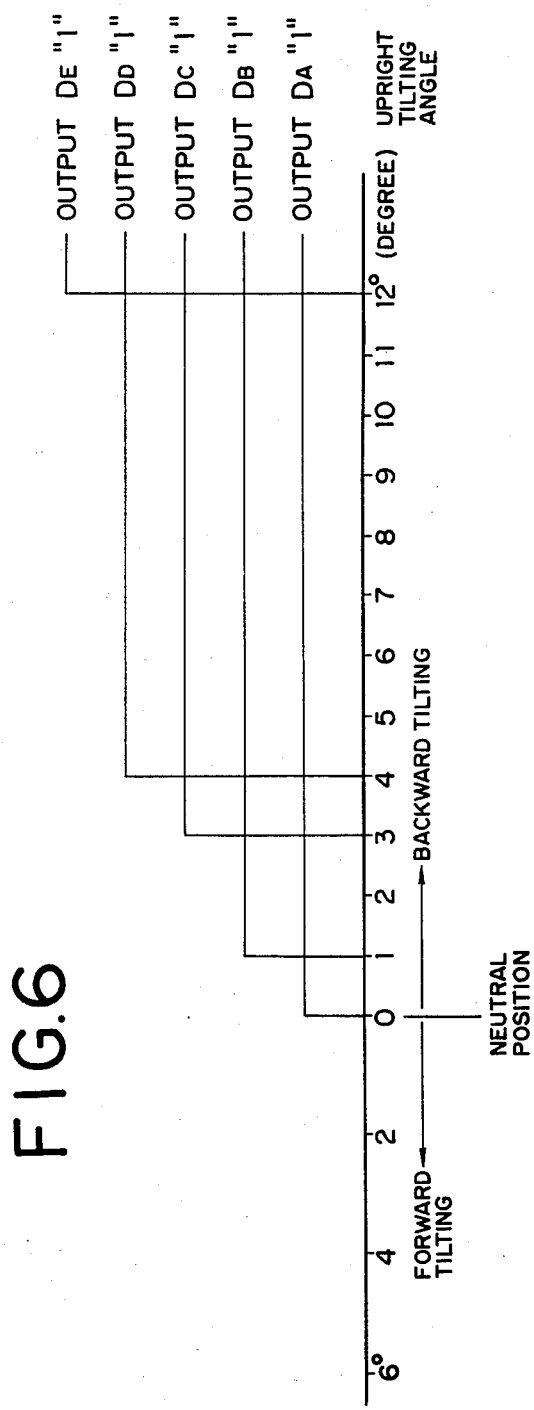

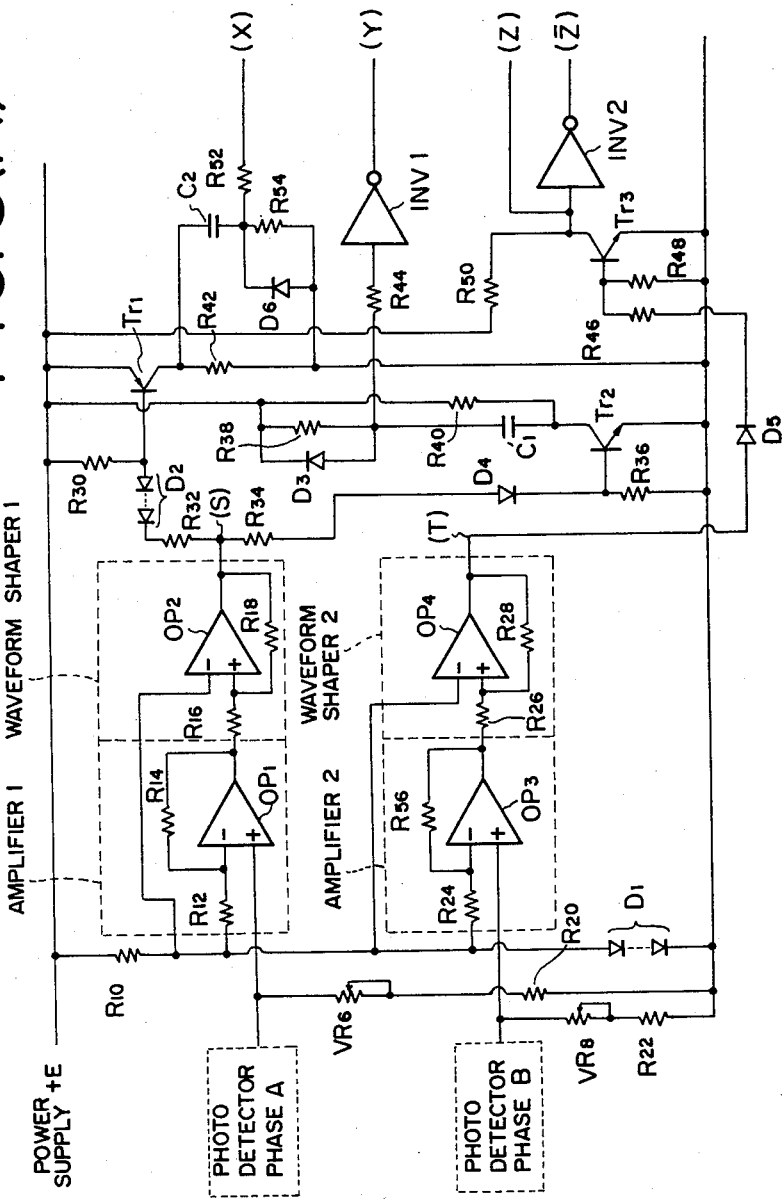

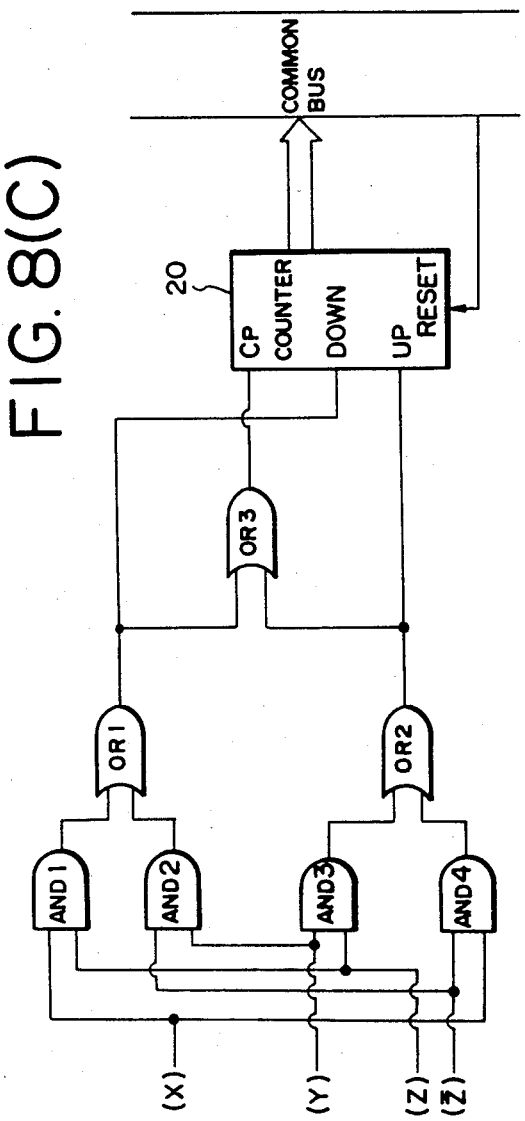

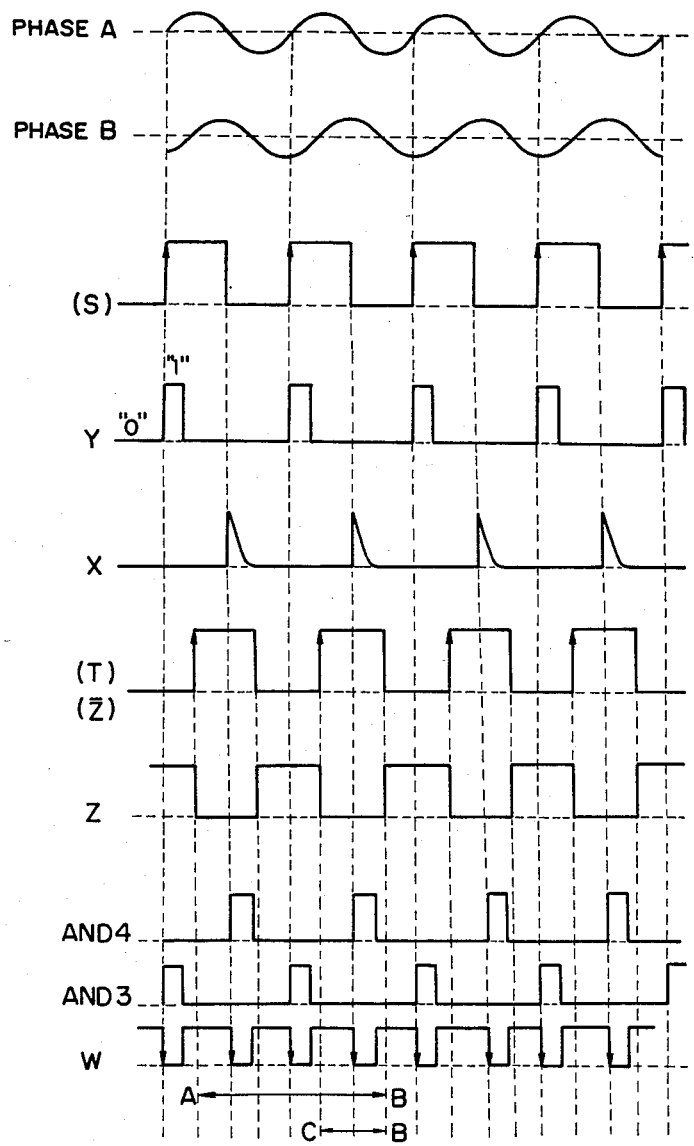

INPUT CIRCUIT OF A FORK LIFT TRUCK CONTROL SYSTEM FOR A FORK LIFT TRUCK

BACKGROUND OF THE INVENTION (1) Field of the Invention

The present invention relates generally to an input circuitry of a fork lift truck control system using a microcomputer, and more particularly to a circuit for detecting and signalling to the microcomputer through a common bus the height of a fork mounted on an upright above its lowest position based on the length of a chain passed through a chain wheel attached on the top end of an inner mast of the upright.

(2) Description of the Prior Art

A fork lift truck comprises, in general, a load lifting mechanism and vehicle body. The load lifting mechanism comprises a vertically elongated guide rail called an "upright" and a fork slidable along the upright.

The load lifting mechanism further comprises: (a) a tilt cylinder attached to a front portion of the vehicle body having a piston interlinked with an outer mast constituting the upright rotatably supported by the front portion of the vehicle body, so that a tilting angle of the upright with its vertical position with respect to the ground as a neutral position can be adjusted; (b) a lift cylinder attached along the elongated direction of the outer mast having a piston interlinked with an inner mast constituting the upright upwardly extendable from the outer mast; (c) a chain wheel rotatably attached to the top end of the piston of the lift cylinder and engaged with a chain, one end of the chain attached to the outer mast or lift cylinder body and the other end of the chain attached to either a lifting member fitted into the inner mast so as to move upward and downward together with the inner mast and fork or to the fork engaged with the lifting member, so that the movement of the lift cylinder causes the inner mast to elevate upward and accordingly causes the fork to move upward along the outer mast by means of the chain engaged with the chain wheel, thereby lifting a load piled thereon.

A microcomputer system has been proposed which performs an automatic lifting operation for the fork and tilting angle control of the upright. An input unit of the microcomputer system comprises a plurality of sensors to be described hereinbelow and microcomputer input interface circuit connected to the sensors. One of the sensors includes a first sensor provided for detecting the height of the fork lifted upward from its lowest position. The first sensor comprises a disc having a plurality of slits along the radial direction thereof and a photocoupler provided across the disc so that the disc can rotate together with the chain wheel through the photocoupler. It will be noted that the disc is attached coaxially to the chain wheel. The photocoupler comprises a light emitting member, e.g., LED (light emitting diode) which emits light toward the disc and a light receiving member, e.g., photo transistor which receives the light passed through the slits provided through the disc and converts the received light into an electrical signal. If the number of the pulse-shaped signals electrically converted on a basis of the light passed through the slits of the disc is counted by means of a counter, the microcomputer can determine the height of the fork lifted from the lowest position. Other sensors include a second sensor for detecting a tilting angle of the upright and third sensor for detecting the presence of load on the fork. The second sensor comprises a potentiometer, located adjacent to the tilt cylinder, across which a DC voltage is applied. The potentiometer is provided with an operation lever and pin attached to the top end of the operation lever, the pin inserted into an elongated hole provided at an oblique angle within a fixed member attached around the outer surface of the piston of the tilt cylinder, so that the operation lever rotates clockwise or counterclockwise as the piston of the tilt cylinder pushes or pulls the outer mast to adjust the tilting angle of the upright. Consequently, the potentiometer sends a variable voltage signal to the input interface circuit of the microcomputer system.

The input interface circuit for the second sensor comprises an analog-to-digital converter. The analog-to-digital converter used in this fork lift truck control device comprises nine resistors, five variable resistors, and five comparators. That is to say, all noninverting input terminals of the five comparators are connected to the potentiometer, i.e., second sensor via a resitor and each inverting input terminal of the five comparators is connected to one of a plurality reference voltage sources formed with a DC voltage supply, resistors, and variable resistors for parallel comparison of the received analog voltage from the potentiometer with each reference voltage corresponding to a value of the tilting angle of the upright. Therefore, a first comparator has a first reference voltage at its inverting input terminal, a second comparator has a second reference voltage at its inverting input terminal, a third comparator has a third reference voltage at its inverting input terminal, a fourth comparator has a fourth reference voltage at its inverting input terminal, and a fifth comparator has a fifth reference voltage at its inverting input terminal. All comparators are previously adjusted to provide a logical "0" level signal when zero voltage or voltage below respective reference voltages is applied to the noninverting input terminals of the comparators. The first reference voltage corresponds to a zero degree (neutral position) tilting angle of the upright, the second reference voltage corresponds to one degree of the backward tilting angle of the upright, the third reference voltage corresponds to three degrees of the backward tilting angle of the upright, the fourth reference voltage corresponds to four degrees of the backward tilting angle of the upright, and the fifth reference voltage corresponds to twelve degrees of the backward tilting angle of the upright.

Therefore, e.g., when the backward tilting angle of the upright is between zero degree and one degree, the output bit string of the analog-to-digital converter indicates 00001 and when the backward tilting angle of the upright is more than twelve degrees, the output bit string of the analog-to-digital converter indicates 11111. It will be noted that the analog-to-digital converter of the type described above is not provided with an encoder circuit for weighing each bit signal since each meaning of the output bit strings is previously identified by the microcomputer main frame.

The third sensor is provided for detecting the weight of load applied on the fork for changing a target value of the tilting angle of the upright so as to place the fork in a horizontal position with respect to the truck body due to the bending of the upright and fork which vary depending on the weight of load, e.g., by measuring a hydraulic pressure within the lift cylinder or by measuring both hydraulic pressure and pneumatic pressure of a front wheel of the vehicle body. When a drive signal indicating that a load is piled on the fork is sent from the third sensor into a switch constituting the input interface circuit to drive the switch to close, the switch is closed to send a "1" signal into the microcomputer main frame. When no drive signal is sent from the third sensor into the switch, the switch remains off so that the microcomputer receives a "0" signal from the switch and judges that no load is piled on the fork.

On the other hand, when the potentiometer output voltage exceeds the first reference voltage, the first comparator only sends a "1" bit signal via a first signal line $D_A$ of five parallel signal lines $D_A$ through $D_E$ within the common bus into the microcomputer main frame to indicate that the upright is tilted more than zero degree (0°) backward (toward the truck body) with respect to the upright position vertically disposed to the ground. Similarly, when the output voltage of the potentiometer exceeds the second reference voltage, the first and second comparators send a 37 1" bit signal through the first and second signal lines into the microcomputer main frame to indicate that the angle of the upright is more than one degree (1°). Consequently, when the output voltage of the potentiometer exceeds the fifth reference voltage, all comparators send "1" bit signals through the signal lines into the microcomputer main frame to indicate that the angle of the upright is tilted backward more than twelve degrees (12°).

Hence, the microcomputer judges from the "0" level signal received from the switch that no load is applied on the fork and performs a feedback control over the tilt cylinder so that the upright tilts backward to an angle within unloaded neutral range {zero degree (0°) through one degree (1°) or, the bit string of the A/D converter indicates 00001}. That is, an operational command is given to a sevomotor circuit connected to the microcomputer main frame to actuate a hydraulic pressure control valve so that the tilt cylinder is operated to tilt the upright at the target value described hereinabove. On the other hand, the microcomputer judges from the "1" level signal received from the switch that a load is applied on the fork and performs the feedback control over the tilt cylinder so that the upright tilts backward at an angle within loaded neutral range (3° through 4°, i.e., the bit string of the A/D converter indicates 00111).

There is, however, a drawback in the input interface circuit of the microcomputer, i.e., a counting circuit for informing the microcomputer main frame of the lifting height of the fork on a basis of the output signal from the first sensor and the analog-to-digital converter for outputting a bit string corresponding to the upright tilting angle. In more detail, in the case of the lifting height counter, since the pulse-shaped signal from the photocoupler, i.e., first sensor is compared directly with a reference voltage subsequently to a waveform shaper so that a rectangular wave is formed and sent into an up/down counter, the amplitude of the pulse-shaped signal generated from the photocoupler is not sufficiently large and stable to enable direct comparison with the reference voltage. In addition, such counting circuit cannot follow the repeated upward and downward movements of the fork within a short distance. Consequently, it is difficult for the UP/DOWN counter to count correctly the number of rectangular pulses produced on a basis of the output signal of the photocoupler.

SUMMARY OF THE INVENTION

With the above-described drawbacks in mind, it is an object of the present invention to provide a fork lift truck control system using a microcomputer as a main control unit wherein an input interface circuit for the first and sensor is improved for always providing correct data of the lifting height of the fork for the microcomputer.

This can be achieved by providing two photocouplers, i.e., light emitting members and light receiving members as the first sensor within the sensing unit of the fork lift truck control system, two output pulsed-shaped signals from the two photocouplers having a phase difference of 90° from each other when the fork is lifted, and accordingly a new lifting height counting circuit in the input interface circuit of the microcomputer which includes an UP/DOWN counter which counts the number of rectangular pulses on the rising or falling edge of each rectangular wave formed by shaping each of the two output signals from the photocouplers.

BRIEF DESCRIPTION OF THE DRAWINGS

The features and advantages of the present invention will be appreciated from the following description taken in conjunction with the accompanying drawings in which like reference numerals designate corresponding elements, and in which:

FIGS. 3(A) and 3(B) show an overall circuit diagram of a fork lift control system;

FIG. 6 shows a relationship of an output bit "1" signal from the analog-to-digital converter with respect to an upright tilting angle;

FIGS. 8(A) and 8(B) show a preferred embodiment of a lifting height counting circuit of the input interface circuit of a microcomputer according to the present invention;

FIG. 8(C) shows an alternative of the peripheral input circuit of an UP/DOWN counter shown in FIG. 8(B); and FIGS. 9(A) and 9(B) show a chart of output waveform timing of each internal circuit block in the lifting height counting circuit shown in FIGS. 8(A) and 8(B) according to the present invention.

DETAILED DESCRIPTION OF THE PREFERRED EMBODIMENTS

Reference will be made hereinafter to the attached drawings and first to FIG. 1 which illustrates a fork lift truck.

Figure 1:
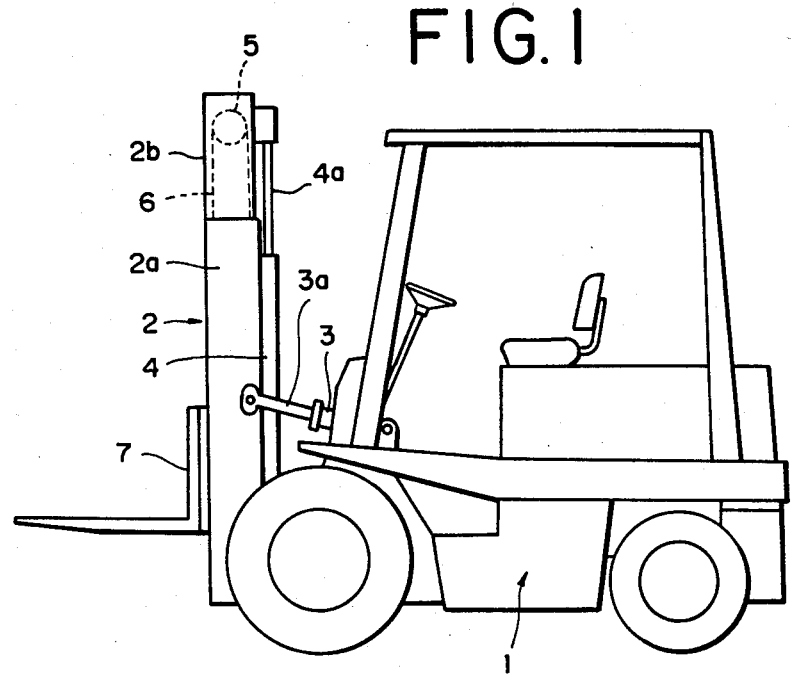
FIG. 1 shows a side view of a fork lift truck.

In FIG. 1, numeral 1 denotes a truck body, numeral 2 denotes an upright comprising an outer mast 2a and an inner mast 2b supported by the outer mast 2a so as to move upward and downward. A lower end of the outer mast 2a is mounted on a front portion of the truck body 1 so as to provide a rotatable support of the outer mast 2a. Numeral 3 denotes a tilt cylinder, one end thereof fixed on the truck body 1 and the other end thereof having a piston 3a attached to the outer mast 2a so that the upright 2 is adjustably tilted in the forward or rearward direction. Numeral 4 denotes a lift cylinder, one end thereof fixed on the outer mast 2a and the other end thereof having a piston 4a engaged with the inner mast 2b. Numeral 5 denotes a chain wheel rotatably mounted on the upper end of the piston 4a. An intermediate portion of a chain 6 is engaged with the chain wheel 5, one end of the chain 6 attached to the outer mast 2a or lift cylinder 4, and the other end thereof mounted on a lifting member (not shown) fitted into the inner mast 2b or a fork 7 supported by the lifting member to permit upward and downward movement of the fork 7 along the outer mast 2a. Accordingly, when the lift cylinder 4 is actuated, the inner mast 2b moves upward. As the inner mast 2b moves upward, the fork 7 pulled by the chain 6 moves upward together with the inner mast 2b, so that a load carriage mounted on the fork 7 can be lifted upward.

Figure 2:
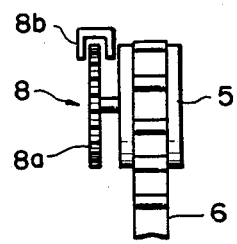
FIG. 2 shows a side view of a first sensor attached to a chain wheel shown in FIG. 1.

On the other hand, in FIG. 2, numeral 8 denotes a first sensor for detecting a lifting height of the fork 7 from the lowest position comprising a disc 8a having a plurality of slits penetrated radially therethrough and an optical device, i.e., photocoupler 8b having a couple of light emitting and light receiving members, e.g., light emitting diode and photo transistor. The disc 8a is coaxially attached to the chain wheel 5 so as to rotate at a speed equal to that of the chain wheel 5. When the disc 8a rotates, a light emitted from the light emitting member is passed through one of the slits of the disc 8a so that a pulse-shaped electrical signal is produced having a number of pulses corresponding to the total length of the chain 6 passed through the chain wheel 5. Therefore, the microcomputer receives the counted value from the UP/DOWN counter and calculates the fork lifting height.

Figure 3A:
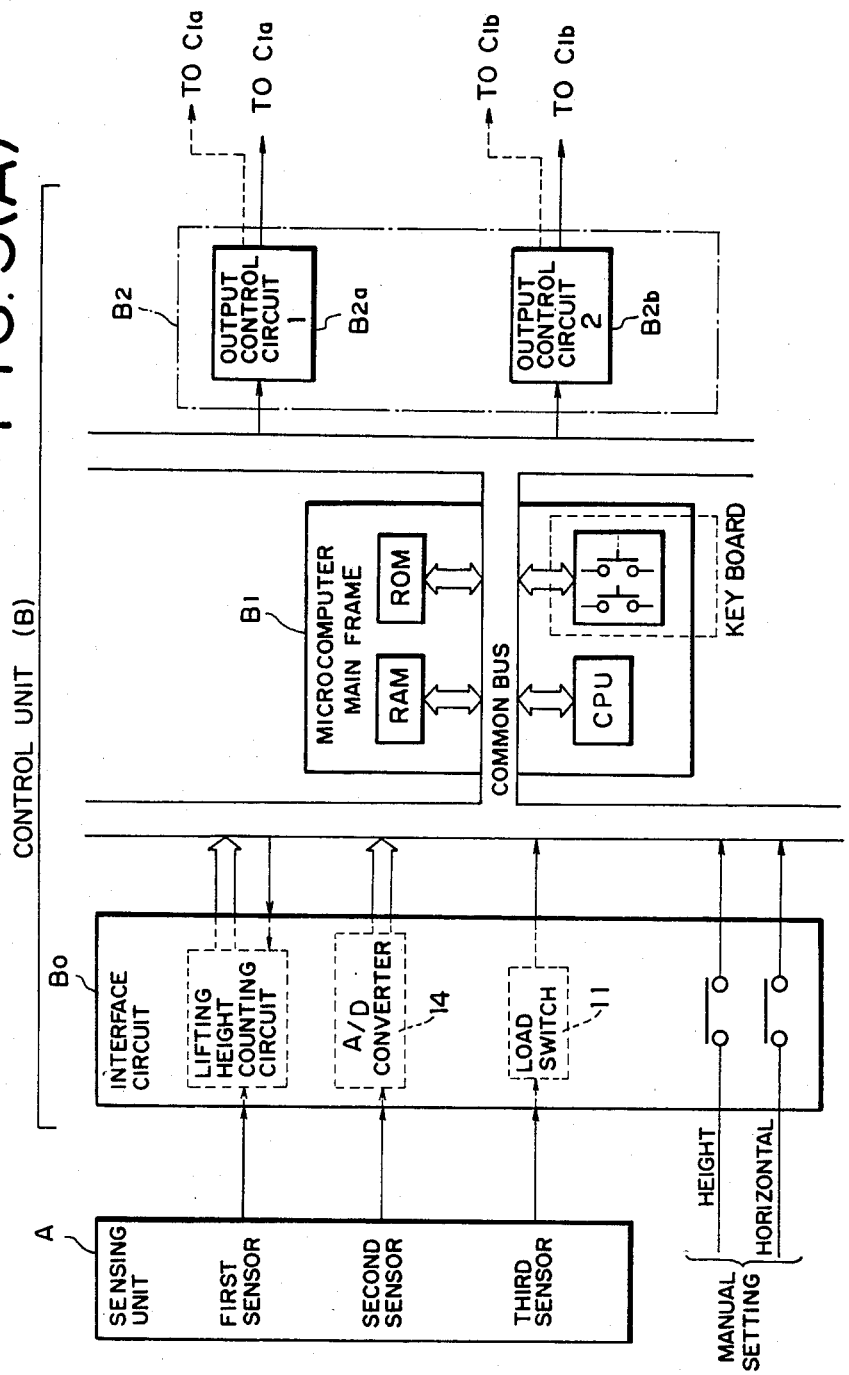

FIGS. 3(A) and 3(B) illustrate a circuit block diagram of a fork lift control system mounted in the fork lift truck shown in FIG. 1. In FIGS. 3(A) and 3(B), symbol A denotes a sensing unit including the first sensor, second sensor, and third sensor. The first sensor is described hereinbefore with reference to FIG. 2 as the photocoupler 8a and disc 8b. The second sensor is described hereinafter with reference to FIG. 4 and the third sensor is also described hereinafter.

Symbol B denotes a control unit comprising an input interface circuit $B_0$, main frame of a microcomputer $B_1$, and output control circuit $B_2$, each connected via a common bus. The microcomputer main frame $B_1$ comprises a Central Processing Unit (CPU), Random Access Memory (RAM), and Read Only Memory (ROM) in which predetermined values of the lifting height of the fork 7, tilting angle of the upright 2, load and other data are stored and in which the lifting height of the fork 7 is indicated on a basis of the currently counted value of the lifting height counting circuit in the input interface circuit Bo and the lifting height value is stored in the RAM so that the fork 7 can lift upward or downward to arrive at a target value and furthermore a key board through which an operator can set desired values of these variables. The microcomputer main frame $B_1$ produces various control command signals based on the output signal from the sensing unit A and data in connection with lifting height, tilting angle, or load piled on the fork 7 stored in the ROM. The output control circuit $B_2$ comprises a first output control circuit $B_{2a}$ provided for controlling a lifting height of the fork 7 through the lifting cylinder 4 and a second output control circuit $B_{2b}$ provided for controlling a tilting angle of the upright 2 through the tilt cylinder 3.

Symbol C denotes a driving unit comprising an electric/hydraulic pressure converter $C_1$ and hydraulic pressure driving unit $C_2$. The electric/hydraulic pressure converter $C_1$ comprises a first and second actuators $C_{1a}$ and $C_{1b}$ responsive to an output signal of the first and second output control circuits $B_{2a}$ and $B_{2b}$, respectively. The hydraulic pressure driving unit $C_2$ comprises a first and second hydraulic pressure control valves $C_{2a}$ and $C_{2b}$ responsive to respective actuation signals from the first and second actuators $C_{1a}$ and $C_{1b}$, respectively. The first control valve $C_{2a}$ is linked with the lift cylinder 4 for controlling a lifting height of the fork 7 while the second control valve $C_{2b}$ is linked with the tilt cylinder 3 for controlling a tilting angle of the upright 2 shown in FIG. 1. A pump P is provided between the first and second control valves $C_{2a}$ and $C_{2b}$ in the hydraulic pressure driving unit $C_2$ for supplying a suitable fluid pressure for these control valves. The above-described first output control circuit $B_{2a}$, first actuator $C_{1a}$, and first hydraulic pressure control valve $C_{2a}$ constitute a servo control circuit for the lifting height control system. Similarly, the above-described second output control circuit $B_{2b}$, second actuator $C_{1b}$, and second hydraulic pressure control valve $C_{2b}$ constitute another servo control circuit for the tilting angle control system.

Figure 4:
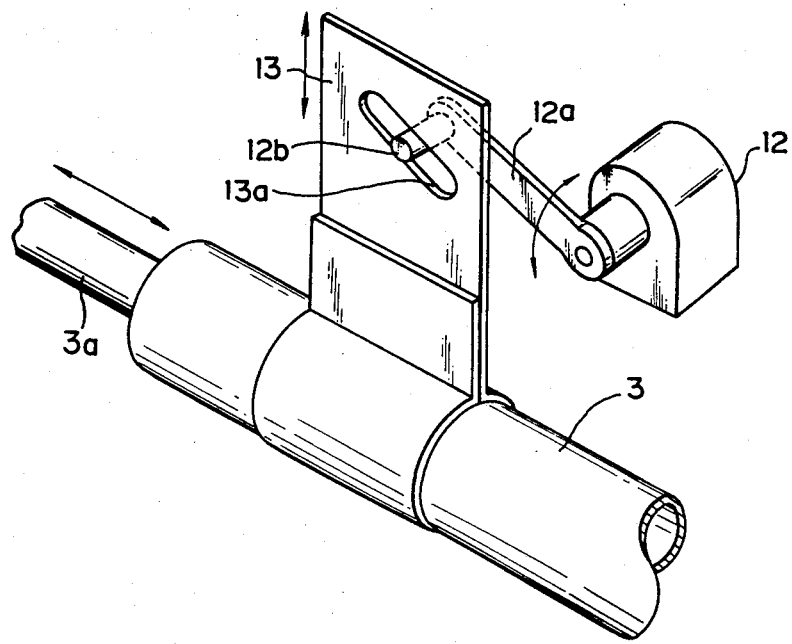
FIG. 4 shows an arrangement of a second sensor attached adjacent to a tilt cylinder.

Next, in FIG. 4, the second sensor in the sensing unit A comprises a potentiometer 12 across which a DC voltage $+E_1$ is applied. As seen from FIG. 5, an operational lever 12a is attached to the potentiometer 12 for varying the resistance of the potentiometer body 12 according to the rotation angle of the operational lever 12a. The operational lever 12a is provided with a pin 12b at the end thereof, the pin 12b movably inserted into an elongated hole 13a of a plate 13 attached around an outer surface of the piston 3a of the tilt cylinder 3. Therefore, as the piston 3a of the tilt cylinder 3 moves, the pin 12b and operational lever 12a move along an oblique direction of the elongated hole 13a. Consequently, the potentiometer 12 produces an analog voltage signal whose voltage level changes according to an angle of the upright 2 tilted with respect to the position of the upright 2 vertically disposed to the ground. The input interface circuit $B_0$ includes an analog-to-digital converter 14 shown by FIG. 3(A) which serves to convert the analog voltage signal from the second sensor, i.e., potentiometer 12 into a digital signal, i.e., five-bit string to be fed into the microcomputer main frame $B_1$. The internal circuit configuration of the analog-to-digital converter 14 is shown in FIG. 5.

Figure 5:
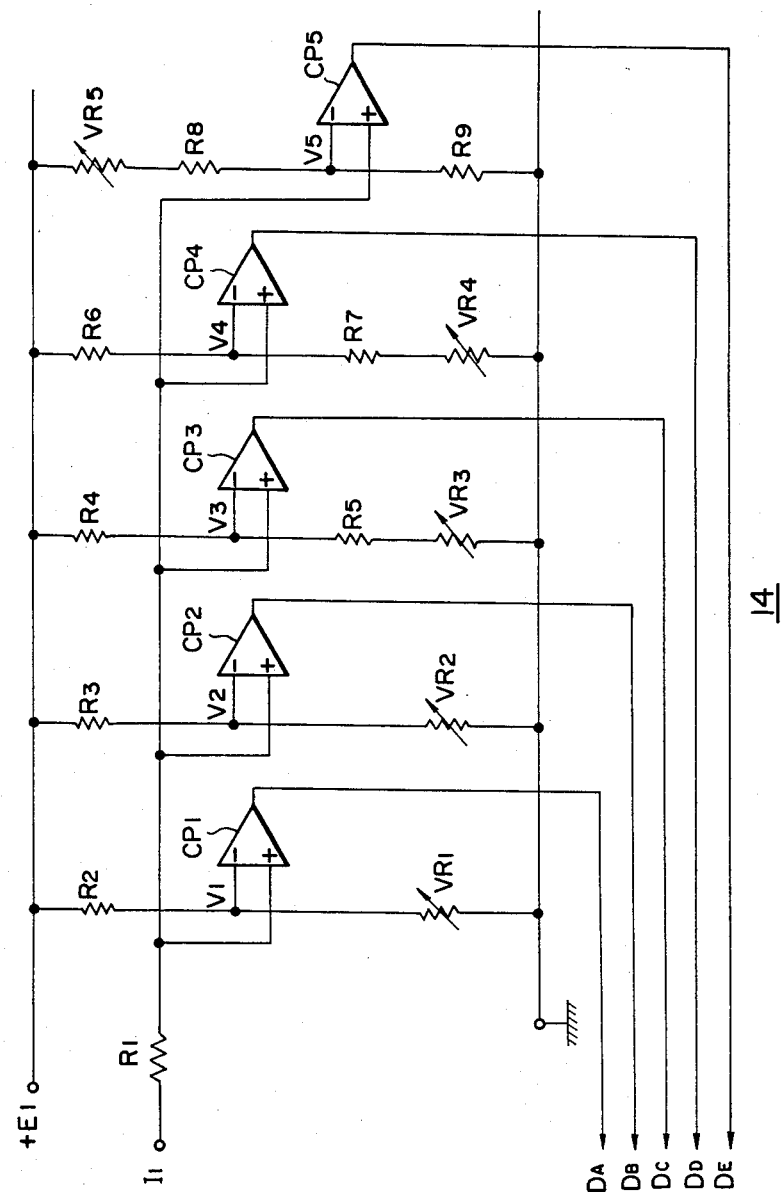
FIG. 5 shows an internal circuit configuration of an analog-to-digital converter shown in FIG. 3(A) which converts an analog voltage signal from the second sensor into a predetermined five-bit string to indicate a backward tilting angle of an upright with respect to the upright position vertically disposed to the ground.

In FIG. 5, the analog-to-digital converter 14 comprises five comparators $CP_1$ through $CP_5$, nine resistors $R_1$ through $R_9$, and five variable resistors $VR_1$ through $VR_5$. A DC voltage is applied between positive terminal $+E_1$ and ground terminal for producing five reference voltage sources. An input terminal $I_1$ is connected via a first resistor $R_1$ to each noninverting input terminal of the comparators $CP_1$ through $CP_5$. An inverting input terminal of the first comparator $CP_1$ is connected via a second resistor $R_2$ to the DC voltage supply $+E_1$ and via a first variable resistor $VR_1$ to the ground, so that a first reference voltage $V_1$ is provided at the inverting input terminal thereof. An inverting input terminal of the second comparator $CP_2$ is connected via a third resistor $R_3$ to the DC voltage supply $+E_1$ and via a second variable resistor $VR_2$ to the ground, so that a second reference voltage $V_2$ is provided at the inverting input terminal thereof. An inverting input terminal of the third comparator $CP_3$ is connected via a fourth resistor $R_4$ to the DC voltage supply $+E_1$ and via a fifth resistor $R_5$ and third variable resistor $VR_3$ to the ground, so that a third reference voltage $V_3$ is provided at the inverting input terminal thereof. An inverting input terminal of the fourth comparator $CP_4$ is connected via a sixth resistor $R_6$ to the DC voltage supply $+E_1$ and via a seventh resistor $R_7$ and fourth variable resistor $VR_4$ to the ground, so that a fourth reference voltage $V_4$ is provided at the inverting input terminal thereof. An inverting input terminal of the fifth comparator $CP_5$ is connected via an eighth resistor $R_8$ and fifth variable resistor $VR_5$ to the DC voltage supply $+E_1$ and via a ninth resistor $R_9$ to the ground. Symbols $D_A$ through $D_E$ denote output signal lines of the analog-to-digital converter 14, $D_A$ denoting a first signal line of the first comparator $CP_1$, $D_B$ denoting a second signal line of the second comparator $CP_2$, $D_C$ denoting a third signal line of the third comparator $CP_3$, $D_D$ denoting a fourth signal line of the fourth comparator $CP_4$, and $D_E$ denoting a fifth signal line of the fifth comparator $CP_5$.

The output voltage of the potentiometer 12 is applied to the analog-to-digital converter 14 via the input terminal $I_1$. When the output voltage of the potentiometer 12 is zero or does not exceed the first reference voltage $V_1$, all signal lines $D_A$ through $D_E$ indicate such a bit string as "00000". When the output voltage of the potentiometer 12 exceeds the first reference voltage $V_1$, the first comparator $CP_1$ outputs a high level voltage signal corresponding to a logical "1" signal, the bit "1" signal at the first signal line $D_A$ indicating that a backward tilting angle of the upright 2 is more than zero degree as shown in FIG. 6. When the output voltage of the potentiometer 12 exceeds the second reference voltage $V_2$, the second comparator $CP_2$ also outputs a high level voltage signal corresponding to a logical "1" signal, the bit "1" signal of the second signal line $D_B$ indicating that a backward tilting angle of the upright 2 is more than one degree. When the output voltage of the potentiometer 12 exceeds the third reference voltage $V_3$, the third comparator $CP_3$ also outputs a high level voltage signal (bit "1") into the third signal line $D_C$ thereof the bit "1" of the third signal line $D_C$ indicating that the upright 2 is tilted backward more than three degrees. When the output voltage of the potentiometer 12 exceeds the fourth reference voltage $V_4$, the fourth comparator $CP_4$ also outputs a high level signal (bit "1") into the fourth signal line $D_D$ thereof, the bit "1" of the fourth signal line $D_C$ indicating that the upright 2 is tilted backward more than four degrees. When the output signal of the potentiometer 12 exceeds the fifth reference voltage $V_5$, the fifth comparator $CP_5$ also outputs a high level signal (bit "1") into the fifth signal line $D_E$ thereof, the bit "1" of the fifth signal line $D_E$ indicating that the backward tilting angle of the upright 2 exceeds twelve degrees (12°). The relationship between a tilted angle of the upright 2 with a vertical position of the upright 2 as a center (neutral position) and output bit signals of the analog-to-digital converter 14 is illustrated in FIG. 6.

Figure 7:
FIG. 7 shows a rectangular waveform to be counted by a conventional lifting height counting circuit.

Next, a drawback of a conventional lifting height counting circuit is described with reference to FIG. 7. In FIG. 7, if the conventional counting circuit counts the number of pulses fed from the first sensor via the waveform shaper on the rising edge of each pulse, the counter counts as "count up 1" during an interval of time from point A to point B, i.e., along a time axis from point A to point B. The counter counts as "count down 1" during an interval of time from point B to point C since the rising edge of the pulse shown in FIG. 11 is reversed. The counter counts as "count 0" during an interval of time from point C to point B. Therefore, when the fork 7 is lifted or lowered repeatedly within a short distance during an interval of time between point B and point C, the counter counts down only so that the counted value does not agree with the actual lifting height of the fork 7.

Figure 8B:
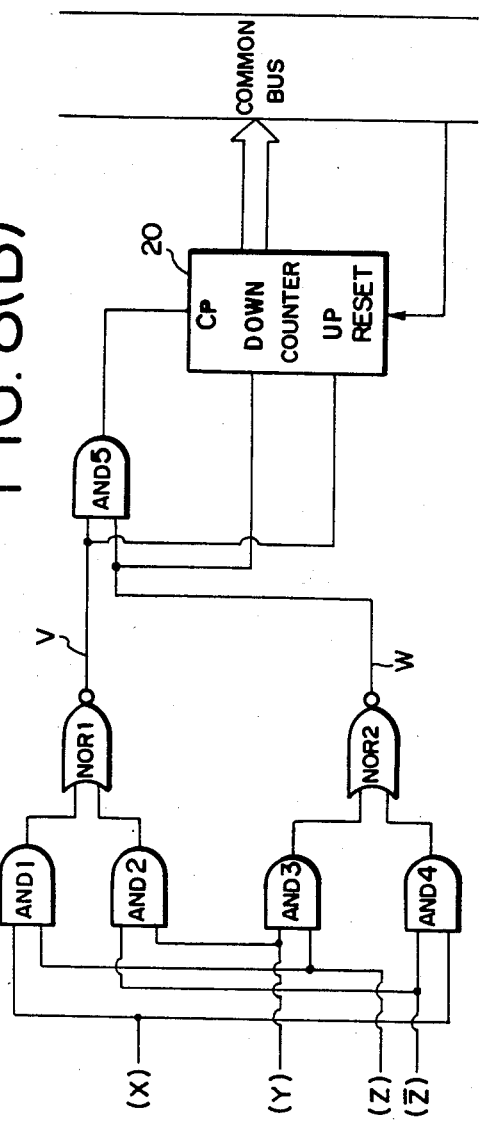

FIGS. 8(A) and 8(B) show a preferred embodiment of a lifting height counting circuit incorporated into the input interface circuit according to the present invention. In FIGS. 8(A) and 8(B), symbols $R_{10}$ through $R_{56}$ denote resistors, symbols $VR_6$ and $VR_8$ denote variable resistors, symbols $OP_1$ through $OP_4$ denote operational amplifiers, symbols $D_1$ through $D_5$ denote diodes, symbols $C_1$ and $C_2$ denote capacitors, symbols INV 1 and INV 2 denote inverter circuits, symbols AND 1 through AND 5 denote AND gate circuits, and numeral 20 denotes an UP/DOWN counter provided for counting and informing the lifting height of the fork 7 to the microcomputer main frame $B_1$.

In this preferred embodiment, the first sensor comprises two photocouplers, i.e., detection phases A and B as shown by FIG. 8(A). It will be noted that, in this preferred embodiment, the detection phase A is located across the disc 8a shown in FIG. 2 with its position lower than the detection phase B with respect to the direction toward which the fork 7 is lowered. The construction and operation of the lifting height counting circuit according to the present invention are described hereinafter first with reference to FIGS. 8(A), 8(B), and 9(A).

The detection phase A sends an electrical signal produced from a light passed through the rotating disc 8a as shown by PHASE A of FIG. 9(A) to a first noninvertingtype amplifier to adjust a voltage level of the electrical signal. The first amplifier comprises a first operational amplifier $OP_1$ whose noninverting input terminal is connected to the detector phase A and ground terminal via the variable resistor $VR_6$ and resistor $R_{20}$ and whose inverting input terminal is connected to plus power supply line $+E$ via the resistors $R_{12}$ and $R_{10}$ and to the output terminal thereof via the resistor $R_{14}$.

The output voltage signal amplified by the first amplifier is sent into a first waveform shaper so that a rectangular waveform shown by (S) of FIG. 9(A) is produced having equal phase and frequency to the electrical signal of the detection phase A. The first waveform shaper comprises a second operational amplifer $OP_2$ whose noninverting input terminal is connected to the output terminal of the first operational amplifier $OP_1$ via the resistor $R_{16}$ and to the output terminal thereof via the resistor $R_{18}$ and whose inverting input terminal is connected to the plus power supply line $+E$ via the resistor $R_{10}$. The waveform shaper is thus formed of a schmidt circuit. During the high level of the rectangular wave signal shown by (S) of FIG. 9(A), a second transistor $Tr_2$ turns on. A base of the second transistor $Tr_2$ is connected to the output terminal of the second operational amplifier $OP_2$ via a fourth diode $D_4$ and resistor $R_{34}$ and to the ground line via the resistor $R_{36}$. During the low level of the rectangular-wave signal shown by (S), the second transistor $Tr_2$ turns off and simultaneously a first transistor $Tr_1$ in turn turns on. A base of the first transistor $Tr_1$ is connected to the output terminal of the second operational amplifier $OP_2$ via a second diode $D_2$ and resistor $R_{32}$, an emitter thereof is connected directly to the plus power supply line $+E$, and a collector thereof is connected to the ground line via resistor $R_{42}$. When the first transistor $Tr_1$ turns on, a voltage at point (X) rises sharply and decreases gradually as shown by (X) of FIG. 9(A). A second capacitor $C_2$ and sixth diode $D_6$ are connected across the resistor $R_{42}$ and resistor $R_{54}$ is connected across the sixth diode $D_6$ to form a differentiator. A point between the second capacitor $C_2$ and sixth diode $D_6$ (or resistor $R_{54}$) is connected to a first AND gate circuit AND 1 and a fourth AND gate circuit AND 4 via a resistor $R_{52}$.

On the other hand, an electrical signal produced by the detection phase B is fed into a second noninverting amplifier, having a phase lag of 90° from the detection phase A as shown by PHASE B in FIG. 9(A). The second amplifier comprises a third operational amplifier $OP_3$ whose noninverting input terminal is connected to the detection phase B and to the ground line via a variable resistor $VR_8$ and resistor $R_{22}$ and whose inverting input terminal is connected to the plus power supply line $+E$ via resistor $R_{24}$ and resistor $R_{10}$ and to the output terminal thereof via resistor $R_{56}$. The amplified signal from the second amplifier is then fed into a second waveform shaper to form another rectangular wave shown by (T) of FIG. 9(A). The construction of the second waveform shaper is exactly the same as that of the first waveform shaper. Therefore, the rectangular wave from the second waveform shaper is outputted with a phase lag of 90° with respect to that outputted from the first waveform shaper, as shown by (S) and (T) of FIG. 9(A). The output voltage signal of the second waveform shaper is thereafter fed into a base of a third transistor $Tr_3$ via a fifth diode $D_5$ and resistor $R_{46}$. The base of the third transistor $Tr_3$ is also connected to the ground line via resistor $R_{48}$, an emitter thereof is connected directly to the ground line, and a collector thereof is connected to the plus power supply line $+E$ via resistor $R_{50}$. When the rectangular wave output signal goes high, the fifth diode $D_5$ conducts and third transistor $Tr_3$ turns on so that an input voltage Z of a second inverter INV 2 turns to a "0" and output voltage $\overline{Z}$ thereof turns to a "1". The input terminal (Z) of the second inverter INV 2 is connected to the collector of the third transistor $Tr_3$ and to input terminals of both the first AND gate circuit AND 1 and third AND gate circuit AND 3. The output terminal ($\overline{Z}$) of the second inverter INV 2 is connected to input terminals of both the second and fourth AND gate circuits AND 2 and AND 4 as shown in FIG. 8(B). As shown in FIG. 8(B), the output terminal (Y) of the first inverter INV 1 is connected to input terminals of both the second and third AND gate circuits AND 2 and AND 3. The output terminals of both the first and second AND gate circuits AND 1 and AND 2 are connected to a first NOR gate circuit NOR 1. The outpout terminals of both the third and fourth AND gate circuits AND 3 and AND 4 are connected to a second NOR gate circuit NOR 2. The output pulse signal Y produced through the first inverter INV 1 shown by Y of FIG. 9(A) is ANDed with the input rectangular wave signal Z of the second inverter INV 2 at the third AND gate circuit AND 3. Therefore, the output signal of the third AND gate circuit AND 3 is formed as shown by AND 3 of FIG. 9(A). On the other hand, the output differentiated signal X is ANDed with the output pulse signal $\overline{Z}$ shown by ($\overline{Z}$) of FIG. 9(A) of the second inverter INV 2 at the fourth AND gate circuit AND 4. The output signal of the fourth AND gate circuit AND 4 is formed as shown by AND 4 of FIG. 9(A). Consequently, the output signal of the second NOR gate circuit NOR 2 is formed as shown by W of FIG. 9(A).

In this case, the output signal of the first AND gate circuit AND 1 is always turned to a "0" since there is no logical coincidence between the differentiated signal X and input signal Z of the second inverter INV 2 as shown by X and Z of FIG. 9(A). Furthermore, the output signal of the second AND gate circuit AND 2 is always turned to a "0" since there is no coincidence between the output signal Y of the first inverter INV 1 and output signal $\overline{Z}$ of the second inverter INV 2. Consequently, the output signal V of the first NOR gate NOR 1 is always turned to a "1". The output signal W of the second NOR gate circuit NOR 2 shown by W of FIG. 9(A) is fed into DOWN terminal of the UP/DOWN binary counter 20 to count decrementally the number of pulses received at the clock terminal $C_p$ thereof whenever one of the pulses falls. The clock pulse to be fed into the UP/DOWN counter 20 may be either the output signal V or W fed through the fifth AND gate circuit AND 5 or a clock pulse fed from an external clock generator. In the latter case, the width of the clock pulse needs to be substantially equal to that of either of output negative going pulse signals V and W described above.

Figure 9B:
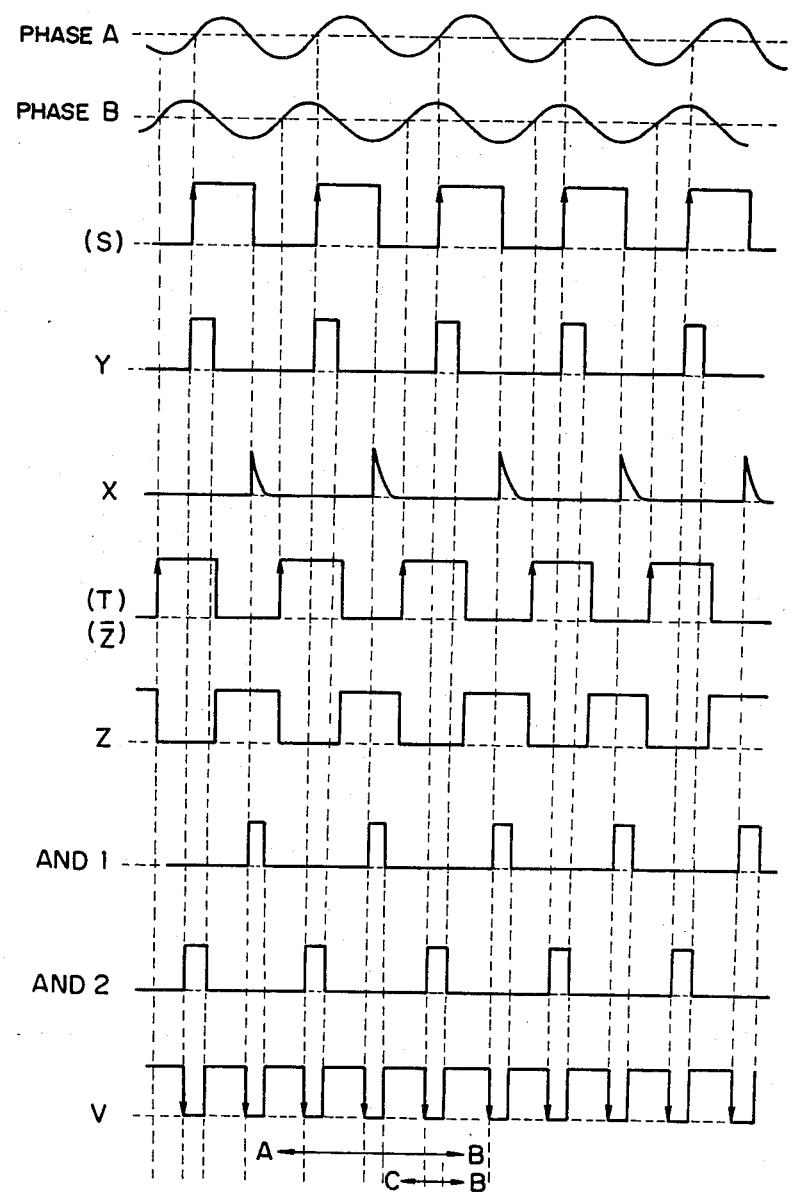

Next, hereinafter described with reference to FIGS. 8(A), 8(B), and 9(B), is the case when the rotational direction of the chain wheel 5 is reversed so that the fork 7 shown in FIG. 1 is lifted upward.

In this case, the phase of the electrical signal from the detection phase B is advanced 90° from that of the other electrical signal from the detection phase A, as shown by PHASE A and PHASE B of FIG. 9(B). The output signal of the first AND gate circuit AND 1 is formed as shown by AND 1 of FIG. 9(B) since there is a logical coincidence between the differentiated signal X and input rectangular wave signal Z of the second inverter INV 2. The output signal of the second AND gate circuit AND 2 is formed as shown by AND 2 of FIG. 9(B) since there is a logical coincidence between the output signal $\overline{Z}$ of the second inverter INV 2 and the output signal Y of the first inverter INV 1. Therefore, the output signal V of the first NOR gate circuit NOR 1 is formed as shown by V of FIG. 9(B) and sent into the UP terminal of the UP/DOWN counter 20 and into the clock terminal $C_p$ thereof via a fifth AND gate circuit AND 5, so that the counter 20 counts incrementally the number of pulses fed into the clock terminal $C_p$ whenever one of the pulses falls. In this case, both output signals of the third and fourth AND gate circuits AND 3 and AND 4 are always turned to "0"s and therefore the output signal of the fifth AND gate circuit AND 5 is only that fed from the first NOR gate circuit NOR 1. The UP/DOWN counter 20 is reset to zero by a reset pulse signal fed from the microcomputer main frame $B_1$ via the common bus when the fork 7 is placed at its lowest position.

FIG. 8(C) illustrates an alternative of the circuit around the UP/DOWN counter 20 shown in FIG. 8(B), wherein a first OR gate circuit OR 1 is connected to the first and second AND gate circuits AND 1 and AND 2 a second OR gate circuit OR 2 is connected to the third and fourth AND gate circuits AND 3 and AND 4 and a third OR gate circuit is connected to the first and second OR gate circuit OR 1 and OR 2. Therefore, each logical level of the output signals from the first, second, and third OR gate circuits OR 1, OR 2, and OR 3 is reversed as compared with V and W shown in FIG. 9(A) and FIG. 9(B).

Since the construction and operation of the lifting height counting circuit according to the present invention are different from the conventional lifting height counter as described hereinabove, there is no difference between the counted value and actual lifting height of the fork 7. For example, in FIG. 9(A) the UP/DOWN counter 20 counts decrementally as "count down 3" during the time interval from point A to point B, i.e., along the time axis from points A to B and in FIG. 9(B) the UP/DOWN counter 20 counts incrementally as "count up 3" during the time interval from point A to point B. Furthermore, in FIG. 9(A) the UP/DOWN counter 20 counts decrementally as "count down 1" during the subsequent time interval from point B and point C and in FIG. 9(B) the UP/DOWN counter 20 counts incrementally as "count up 1" during the subsequent time intervals from point B to point C. These time intervals between points A, B, and C are the same as those shown in FIG. 7.

In this way, according to the present invention there is provided in the input interface circuit of the microcomputer constituting the fork lift truck control system an improved lifting height counting circuit for detecting the lifting height of the fork from the total movement distance of the chain linked with the fork passed through the chain wheel, whereby the fork lift truck control system can perform more accurate automatic control of the lifting operation of the fork.

It will be understood by those skilled in the art that the foregoing description is in terms of preferred embodiments of the present invention wherein various changes and modifications may be made without departing from the spirit and scope of the present invention, which is to be defined by the appended claims.

What is claimed is:

1. A forklift truck control system for a fork lift truck including:
    (A) a sensing unit including a first sensor for detecting optically and signalling electrically a lifting height of a fork located on a front side of the fork lift truck vertically movable with respect to an upright from a lowest position thereof, a second sensor for detecting and signalling a tilting angle of the upright with respect to a neutral position of the upright, and a third sensor for detecting and signalling the load applied on the fork;
    (B) a control unit which stores and produces various predetermined command signals to control the lifting height of the fork and tilting angle of the upright according to the various detection signals received from said sensing unit, said control unit comprising a microcomputer main frame which stores and outputs predetermined command signals and an input interface circuit connected between said sensing unit and the microcomputer main frame via a common bus for producing and inputting the data based on each of the output signals from said sensing unit into the microcomputer main frame when the microcomputer main frame issues an input command to input one of the produced data thereinto, and
    (c) a driving unit, responsive to one of the predetermined command signals from said control unit, which drives a tilt cylinder for tilting the upright backward to an angle corresponding to the predetermined command signal and which drives a lift cylinder for lifting and lowering the fork according to the predetermined command signal so as to change the lifting height of the fork to a target height,
the improvement wherein said first sensor comprises a disc through which a plurality of slits are penetrated along the radial direction thereof and two photocouplers provided across said disc,
said disc attached coaxially on a chain wheel which is attached to an inner mast of the upright and to a top end of a piston of the lift cylinder and rotating as a chain engaged with the chain wheel moves according to the movement of the piston of the lift cylinder, one end of the chain attached to an outer mast of the upright and the other end thereof linked with the fork,
one of the photocouplers producing an electrical signal having a phase difference of 90° from that of a signal produced by the other photocoupler whenever a light emitted from a light emitting member of each photocoupler is passed through one of the slits of said disc, together with a lift height counting circuit including:
    (a) two voltage amplifiers, each having an input connected to a separate one of said two photocouplers, each of said amplifiers amplifying the electrical signal received from the corresponding photocoupler and producing an output signal on an output terminal thereof;
    (b) two waveform shapers, each having an input connected to the output of a separate one of said two amplifiers, each of said shapers shaping the waveform of the output signal from the corresponding amplifier into a rectangular wave;
    (c) a first differentiator, connected to an output of one of said two waveform shapers, for differentiating each falling edge of the rectangular wave fed from the corresponding waveform shaper;
    (d) a second differentiator, connected to said output of said waveform shaper in parallel with said first differentiator, for differentiating each rising edge of the rectangular wave fed from the corresponding waveform shaper;
    (e) a first inverter, connected to an output of said first differentiator, for inverting the logical level thereof;
    (f) a second inverter, connected to an output of the other waveform shaper which inverts the logical level thereof;
    (g) four AND gate circuits, a first AND gate circuit having inputs connected to an output of said second differentiator and to an input terminal of said second inverter, a second AND gate circuit having inputs connected to an output terminal of said first inverter and to an output terminal of said second inverter, a third AND gate circuit having inputs connected to said output of said first inverter and to the input terminal of said second inverter, and a fourth AND gate circuit having inputs connected to the output of said second differentiator and to the output terminal of said second inverter;

(h) a first OR gate circuit having inputs connected to outputs of said first and second AND gate circuits;

(i) a second OR gate circuit having inputs connected to outputs of said third and fourth AND gate circuits;

(j) a third OR gate circuit having inputs connected to outputs of said first and second OR gate circuit; and (k) an UP/DOWN counter, a clock terminal of which is connected to an output of said third OR gate circuit, an UP terminal of which is connected to the output of said second OR gate circuit, and a DOWN terminal of which is connected to the output of said first OR gate circuit, for counting incrementally the number of output pulses from said third OR gate circuit when an output pulse signal from said second OR gate circuit is received at the UP terminal thereof, for counting decrementally the number of output pulses from said third OR gate circuit when an output pulse signal from said first OR gate circuit is received at the DOWN terminal thereof, and including a reset terminal for resetting the counter to zero when the fork is placed at its lowest position.

2. A fork lift truck control system for a fork lift truck as recited in claim 1, wherein the input interface circuit of said control unit comprises:

a lifting height counting circuit, connected to each of said two photocouplers for counting incrementally or decrementally the length of chain passed through the chain wheel based on output electrical signals converted by said two photocouplers.

3. A forklift truck control system for a fork lift truck including:

(A) a sensing unit including a first sensor for detecting optically and signalling electrically a lifting height of a fork located on a front side of the fork lift truck vertically movable with respect to an upright from a lowest position thereof, a second sensor for detecting and signalling a tilting angle of the upright with respect to a neutral position of the upright, and a third sensor for detecting and signalling the load applied on the fork;

(B) a control unit which stores and produces various predetermined command signals to control the lifting height of the fork and tilting angle of the upright according to the various detection signals received from said sensing unit, said control unit comprising a microcomputer main frame which stores and outputs predetermined command signals and an input interface circuit connected between said sensing unit and the microcomputer main frame via a common bus for producing and inputting the data based on each of the output signals from said sensing unit into the microcomputer main frame when the microcomputer main frame issues an input command to input one of the produced data thereinto, wherein the input interface circuit of said control unit comprises a lift height counting circuit, connected to each of said two photocouplers for counting incrementally or decrementally the length of chain passed through the chain wheel based on output electrical signals converted by said two photocouplers, (C) a driving unit, responsive to one of the predetermined command signals from said control unit, which drives a tilt cylinder for tilting the upright backward to an angle corresponding to the predetermined command signal and which drives a lift cylinder for lifting and lowering the fork according to the predetermined command signal so as to change the lifting height of the fork to a target height, (D) said first sensor comprising a disc through which a plurality of slits are penetrated along the radial direction thereof and two photocouplers are provided across said disc, (E) said disc attached coaxially on a chain wheel which is attached to an inner mast of the upright and to a top end of a piston of the lift cylinder and rotating as a chain engaged with the chain wheel moves according to the movement of the piston of the lift cylinder, one end of the chain attached to an outer mast of the upright and the other end thereof linked with the fork, one of the photocouplers producing an electrical signal having a phase difference of 90° from that of a signal produced by the other photocoupler whenever a light emitted from a light emitting member of each photocoupler is passed through one of the slits of said disc, (F) said lift height counting circuit including:

(a) two voltage amplifiers, each having an input connected to a separate one of said two photocouplers, each of said amplifiers amplifying the electrical signal received from the corresponding photocoupler and producing an output signal on an output terminal thereof;

(b) two waveform shapers, each having an input connected to the output of a separate one of said two amplifiers, each of said shapers shaping the waveform of the output signal from the corresponding amplifier into a rectangular wave;

(c) a first differentiator, connected to an output of one of said two waveform shapers, for differentiating each falling edge of the rectangular wave fed from the corresponding waveform shaper;

(d) a second differentiator, connected to said output of said waveform shaper in parallel with said first differentiator, for differentiating each rising edge of the rectangular wave fed from the corresponding waveform shaper;

(e) a first inverter, connected to an output of said first differentiator, for inverting the logical level thereof;

(f) a second inverter, connected to an output of the other waveform shaper which inverts the logical level thereof;

(g) four AND gate circuits, a first AND gate circuit having inputs connected to an output of said second differentiator and to an input terminal of said second inverter, a second AND gate circuit having inputs connected to an output terminal of said first inverter and to an output terminal of said second inverter, a third AND gate circuit having inputs connected to said output of said first inverter and to the input terminal of said second inverter, and a fourth AND gate circuit having inputs connected to the output of said second differentiator and to the output terminal of said second inverter;

(h) a first NOR gate having inputs connected to outputs of said first and second AND gate circuits;

(i) a second NOR gate circuit having inputs connected to outputs of said third and fourth AND gate circuits;

(j) a fifth AND gate circuit having inputs connected to outputs of said first and second NOR gate circuits; and (k) an UP/DOWN counter, a clock terminal of which is connected to an output of said fifth AND gate circuit, an UP terminal of which is connected to the output of said second NOR gate circuit, and a DOWN terminal of which is connected to the output of said first NOR gate circuit, for counting incrementally the number of output pulses from said fifth AND gate circuit when an output pulse signal from said second NOR gate circuit is received at the UP terminal thereof, for counting decrementally the number of output pulses from said fifth AND gate circuit when an output pulse signal from said first NOR gate circuit is received at the DOWN terminal thereof, and including a reset terminal for resetting the counter to zero when the fork is placed at the lowest position.

4. A fork lift truck control system as set forth in either claim 1 or 3, wherein said one of said two waveform shapers connected to said first and second differentiators is connected via the corresponding amplifier thereof to one of said two photocouplers which outputs the photo-converted electrical signal having a 90° advance in phase with respect to the other photo-converted electrical signal outputted from the other photocoupler when the fork is lowered.

5. A fork lift truck control system as set forth in either claim 1 or 3, wherein said one of said two waveform shaper connected to said first and second differentiators is connected via the corresponding amplifier thereof to one of said two photocouplers which outputs the photo-converted electrical signal having a 90° lag in phase with respect to the other photo-converted electrical signal outputted from the other photocoupler when the fork is lifted upward.

6. A fork lift truck control system for a fork lift truck having a fork located on a front side of the fork lift truck and which is movable vertically with respect to an upright from a lowest position thereof, a chain wheel member attached to an inner mast of the upright and to a top end of a piston of a lift cylinder for rotation by a chain engaged with the chain wheel and moving according to the movement of the piston of the lift cylinder, the chain extending between an outer mast of the upright and the fork, the fork lift truck control system comprising:

a pair of transducer means for generating two continuous electrical signals having a phase difference of substantially 90° with each other whenever the chain is moved on the chain wheel member, and a circuit means which receives said two electrical signals from said pair of transducers, for amplifying said signals, for shaping said signals into two respective rectangular-wave signals switching between first and second logic levels, for producing a first logic signal (Y) whenever a predetermined one (S) of said two rectangular-wave signals switches in one direction, a second logic signal (X) whenever said predetermined rectangular-wave signal (S) switches in an opposite direction, a third logic signal (Z) whenever the other rectangular-wave signal (T) is at a first logic level and a fourth logic signal (Z) whenever the other rectangular-wave signal (T) is at a second logic level, and for incrementally or decrementally counting the number of count occurrence signals which are derived from the logical sum of logical AND of said first and third signals and logical AND of said second and fourth signals $(Y\overline{Z}+XZ)$ or the logical sum of logical AND of siad first and fourth signals and logical AND of said second and third signals $(YZ+X\overline{Z})$ depending upon a direction of rotation of said chain wheel member, said circuit means including means for determining the rotational direction of said chain wheel member based on whether the logical sum $(Y\overline{Z}+XZ)$ of logical AND of said first and third signals and logical AND of said second and fourth signals or the logical sum $(YZ+X\overline{Z})$ of logical AND of said first and fourth signals and logical AND of said second and third signals has a predetermined logical value.

7. A fork lift truck control system for a fork lift truck as recited in claim 6, further comprising control means for storing and producing various predetermined command signals to control the lifting height of the fork and a tilting angle of the upright according to the signals produced by said transducer means, said control means comprising a microcomputer for storing and outputting predetermined command signals and an input interface circuit connected between said transducer means and the microcomputer for producing and inputting data based on the signals generated by said transducer means, said interface circuit comprising a lifting height counting circuit, connected to said pair of transducer means, for counting incrementally or decrementally the length of chain passed through the chain wheel based on said electrical signals amplified and shaped by said circuit means.

* * * * *

UNITED STATES PATENT AND TRADEMARK OFFICE
CERTIFICATE OF CORRECTION

PATENT NO. : 4,499,541

DATED : February 12, 1985

INVENTOR(S) : Katsumi YUKI, Susumu YOSHIDA, Mineo OZEKI, Yasuyuki MIYAZAKI, Masaru KAWAMATA It is certified that error appears in the above-identified patent and that said Letters Patent is hereby corrected as shown below:

In the Cover Page, Item [73], following "Japan", please insert --, and Kabushiki Kaisha Meidensha, Japan--.

Signed and Sealed this

Tenth Day of December 1985

[SEAL]

Attest:

DONALD J. QUIGG

Attesting Officer

Commissioner of Patents and Trademarks